UNITED STATES PATENT OFFICE.

PIERRE FÉLICIEN HUBERTY, OF ALFORT, FRANCE, ASSIGNOR TO SOCIETE F. HUBERTY ET CIE, OF ALFORT, SEINE, FRANCE.

PROCESS FOR OBTAINING MILK VINEGAR.

1,410,809.  Specification of Letters Patent.  Patented Mar. 28, 1922.

No Drawing.  Application filed July 2, 1920. Serial No. 393,696.

(GRANTED UNDER THE PROVISIONS OF THE ACT OF MARCH 3, 1921, 41 STAT. L., 1313.)

*To all whom it may concern:*

Be it known that I, PIERRE FÉLICIEN HUBERTY, a citizen of the Republic of France, residing at Alfort, Seine, France, have invented new and useful Improvements in a Process for Obtaining Milk Vinegar, (for which I have filed applications in France Oct. 3, 1913, Patent No. 463,266, and in Germany May 6, 1914,) of which the following is a specification.

It is well known that milk vinegar is prepared from the serum which constitutes the residual matter from the manufacture of casein and of which the principal components are: milk sugar (lactose), nitrogenous matter (casein and albuminoid substances), mineral salts (phosphides, chlorides and sulphates of potassium, sodium, calcium, magnesium, iron, etc.).

The milk vinegar obtainable from this serum should be free from the greater part of the albuminoid substances, in order that it may possess good qualities of preservation.

The process hitherto employed for separating these substances consisted in effecting their precipitation by heat (heating to 110 degrees centigrade in a digester), but in carrying out this operation the final product (milk vinegar) has a pronounced taste of cooked material.

For the purpose of overcoming this inconvenience which is of a capital nature, we have devised a process consisting in the cold separation of soluble albuminoid substances.

To this end the following method can be employed:

A.—Precipitation by tannin of the soluble albuminoid substances, after previously determining the proportion of tannin to precipitate said albuminoid substances, this precipitation being effected either before diluting by alcohol or in the solution diluted by alcohol, or upon the final product (milk vinegar).

B.—The albuminoid substances are precipitated by the alcohol used to constitute the alcoholic dilution, after concentrating the serum in vacuo chiefly in order to avoid communicating thereto a taste of cooked material.

C.—Evaporation by the dry process is effected in vacuo chiefly at a pressure of 720 millimeters of mercury, then the product is taken up by the water of distillation; the milk sugar and the mineral salts now re-dissolve, while the almuminoid substances remain in the insoluble state.

In all three cases, the precipitates or residues obtained are separated by cold filtration in the filter press. To the serum thus filtered out is added a certain amount of alcohol in order to arrive at a strength corresponding to the proportion of acetic acid occurring in commercial vinegar.

The solution thus diluted is treated in an acetification apparatus in which it is subjected to acetic fermentation in the presence of mycoderma aceti. After standing for the proper length of time upon chips, the vinegar thus obtained is filtered by the use of a filter composed entirely of wood and canvas, and is then placed in the usual commercial containers such as bottles or casks.

The improvements according to this invention also consist in the method by which the serum is not submitted to the alcoholic fermentation, in order that the final product (milk vinegar) shall retain the milk sugar inasmuch as this latter is not of a fermentable nature and is therefore only partially subjected to the action of the mycoderma aceti during the process of acetification.

Having thus described the nature of my said invention and the best means I know of carrying the same into practical effect, I claim:

1. The method of making milk vinegar containing milk sugar and free of cooking taste, which comprises effecting a cold separation of casein from skimmed milk, then separating albuminoid substances, adding alcohol to raise the acidity of the final product to that of normal vinegar, and finally subjecting the product to acetic fermentation.

2. The method of making milk vinegar containing milk sugar and free of cooking taste which comprises effecting the cold separation of casein from skimmed milk, adding alcohol sufficient to precipitate albuminoid substances and to raise the acidity of the final product to that of normal vinegar and subjecting the final product to acetic fermentation.

3. The method of making milk vinegar which comprises separating the casein from skimmed milk, then removing the albuminoids without heating by rendering them insoluble, and then subjecting the resulting product to acetic acid fermentation in the presence of alcohol.

4. The method of making vinegar from skimmed milk, which comprises effecting acetic acid fermentation thereof in the presence of alcohol after the casein and albuminoids have been removed from the milk.

In witness whereof, I have hereunto signed my name in the presence of a subscribing witness.

HUBERTY, PIERRE FÉLICIEN.

Witness:
    CLEMENT S. EDWARDS.